United States Patent
Schifferer et al.

(10) Patent No.: US 8,095,285 B2
(45) Date of Patent: Jan. 10, 2012

(54) METHOD FOR DERATING A POWER SOURCE TO LIMIT DAMAGE

(75) Inventors: Andrew N. Schifferer, Batavia, IL (US); Matthew A. Tobben, East Peoria, IL (US); Alan W. Schweizer, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 695 days.

(21) Appl. No.: 11/819,904

(22) Filed: Jun. 29, 2007

(65) Prior Publication Data

US 2009/0000292 A1 Jan. 1, 2009

(51) Int. Cl.
*F16H 61/18* (2006.01)
*F16H 61/462* (2010.01)

(52) U.S. Cl. .............................. 701/54; 701/103; 701/50

(58) Field of Classification Search ................ 701/1, 36, 701/50, 51, 53, 54, 58, 100, 103
See application file for complete search history.

(56) References Cited

U.S. PATENT DOCUMENTS

| | | | |
|---|---|---|---|
| 4,157,124 A | 6/1979 | Poore | |
| 5,184,527 A | 2/1993 | Nakamura | |
| 5,720,358 A | 2/1998 | Christensen et al. | |
| 5,866,809 A | 2/1999 | Söderman | |
| 5,910,176 A | 6/1999 | Creger | |
| 5,957,991 A | 9/1999 | Yasuda | |
| 6,152,275 A | 11/2000 | Fischer et al. | |
| 6,560,549 B2 | 5/2003 | Fonkalsrud et al. | |
| 6,636,795 B1 | 10/2003 | Morscheck | |
| 2005/0029034 A1 | 2/2005 | Stervik | |
| 2005/0131611 A1* | 6/2005 | Anderson et al. | 701/50 |
| 2006/0001224 A1 | 1/2006 | Bitter et al. | |
| 2006/0042241 A1* | 3/2006 | Bright et al. | 60/431 |
| 2007/0016355 A1 | 1/2007 | Kamado et al. | |
| 2008/0121684 A1* | 5/2008 | Gualandri | 235/375 |
| 2008/0227596 A1 | 9/2008 | Schifferer | |

FOREIGN PATENT DOCUMENTS

| | | |
|---|---|---|
| GB | 1132473 | 11/1968 |
| JP | 61160651 | 7/1986 |
| JP | 4307159 | 10/1992 |
| JP | 5060219 | 3/1993 |
| JP | 6280605 | 10/1994 |

* cited by examiner

*Primary Examiner* — Mark Hellner
*Assistant Examiner* — Ari M Diacou
(74) *Attorney, Agent, or Firm* — Finnegan, Henderson, Farabow, Garrett & Dunner LLP

(57) ABSTRACT

A method for derating a power source to limit damage to a drive train of a machine including determining a first operational parameter associated with a power conversion unit and a second operational parameter associated with the power source, selecting, based on the first operational parameter associated with the power conversion unit and the second operational parameter associated with the power source, a power source derate value, and reducing an available power output associated with the power source according to the derate value.

20 Claims, 3 Drawing Sheets

METHOD FOR DERATING A POWER SOURCE TO LIMIT DAMAGE

TECHNICAL FIELD

This disclosure relates generally to controlling power output of a power source and, more particularly, to a method for variably derating a power source to limit damage to drive train components.

BACKGROUND

Machines such as, for example, dozers, loaders, excavators, motor graders, and other types of heavy machinery typically include a power source linked to a power conversion unit. Such a configuration is used for transmitting torque from the power source to one or more axle assemblies operatively connected to one or more traction devices for movement of the vehicle over one or more supporting surfaces (e.g., the ground). Torque applied at the axle assemblies may result in rotational motion of components associated with the axle assemblies and, in turn, the traction devices. Thus, the machine may be put in motion based on available friction between the traction devices and the supporting surface, among other things.

The transmission of high torques from the power conversion unit to the axle assemblies may result in strain and possible damage to components of the axle assemblies, particularly where friction between the traction devices and supporting surface is high. Such strain and damage can eventually or immediately lead to failure of components associated with the axle assemblies (e.g., gear bending, gear pitting, roller bearing damage, ball bearing damage, etc.) and removal of the machine from operation for repairs.

The torque applied at the axle assembly may vary based on a gear ratio associated with the power conversion unit, and a power output associated with the power source, among other things. For example, in a first gear associated with a machine, greater torque may be provided to the axle assembly than when in a higher gear (e.g., gears 2-4). Therefore, to limit torque, some systems may cause a power source to operate on one or more pre-defined power curves based on a gear selection associated with a machine. For example, when an operator places a machine in first gear, the power source associated with the machine may be "derated" (i.e., caused to operate on a power curve with an apparent reduced maximum power) to a pre-defined sub-optimal power curve below an optimal power curve associated with the power source. Operation on this sub-optimal power curve may continue as long as the gear selection remains first gear. Such operation, while limiting the potential for torque damage to the drive train, may lead to inefficiencies in performance and operator dissatisfaction, among other things. Further, use of each power curve (both optimal and any sub-optimal power curves) may entail certification with environmental regulatory agencies to ensure compliance with applicable emissions regulations. This may result in an expensive battery of compliance testing for each new additional power curve.

One system for limiting power is described in U.S. Patent Pub. 2006/0001224 (the '224 publication) to Bitter et al., published on Jan. 5, 2006. The '224 publication discloses a loading machine with at least one overload protection device with sensors for determining an overload state in the drive train. The '224 publication teaches various embodiments including the use of strain gauges and ground speed sensors, among others, for detecting operational characteristics of a machine. Such signals from the sensors are then used for determining whether the machine is being operated under a critical operating condition, and signals configured to limit the driving power are generated.

Although the system and method of the '224 publication may provide for controlling of driving power based on an overload condition, it requires determining a ground speed and/or the addition of various strain gauges and other sensors for determination of the overload condition. As such, operation of such an overload control may be both under- and over-inclusive, thereby limiting machine power when not necessary and/or failing to limit machine power when desired. In other words, machine performance and/or component life may suffer. Further, the addition of such sensors may add additional expense to production costs, thereby affecting a manufacturer's bottom line.

The present disclosure is directed at overcoming one or more of the problems or disadvantages in the prior art control systems.

SUMMARY OF THE DISCLOSURE

In one embodiment consistent with the present disclosure, a method for derating a power source to limit damage to a drive train of a machine is provided. The method may include determining a first operational parameter associated with a power conversion unit and a second operational parameter associated with the power source, selecting, based on the first operational parameter associated with the power conversion unit and the second operational parameter associated with the power source, a power source derate value, and reducing an available power output associated with the power source according to the derate value.

In another embodiment consistent with the present disclosure, a method for controlling a drive train torque on a machine is provided. The method may include determining, based on an output speed associated with a torque converter and a speed associated with a power source, a torque converter speed ratio, determining, based on the torque converter speed ratio and the speed associated with the engine, a power source derate value, and providing a control signal according to the power source derate value to derate the power source to operate on a reduced-power power curve.

In yet another embodiment consistent with the present disclosure, a machine is provided. The machine may include a frame, a traction device associated with one or more drive train components, a power source mounted to the frame and operatively connected to a power conversion unit, the power conversion unit operatively connected to the one or more traction devices, and a control module. The control module may be configured to determine a first operational parameter associated with a power conversion unit and a second operational parameter associated with the power source, select, based on the first operational parameter associated with the power conversion unit and the second operational parameter associated with the power source, a power source derate value, and reduce an available power output associated with the power source according to the derate value.

DETAILED DESCRIPTION

Figure 1:
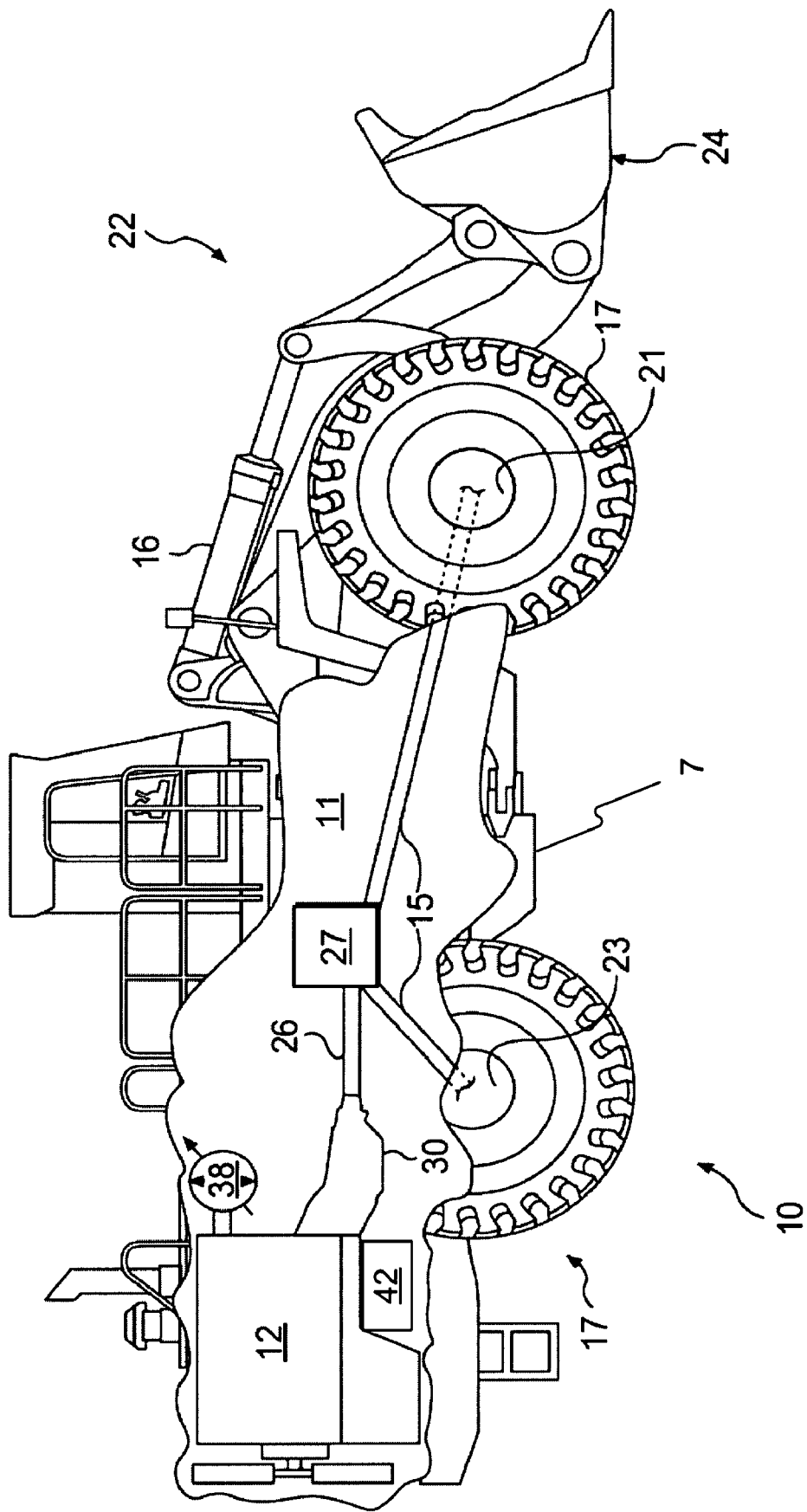
FIG. 1 illustrates an exemplary embodiment of a machine.

FIG. 1 illustrates an exemplary embodiment of a machine 10. Machine 10 may be a mobile machine that performs some type of operation associated with an industry such as mining, construction, farming, or any other industry known in the art. For example, machine 10 may be an earth moving machine such as a wheel loader, an excavator, a dump truck, a backhoe, a motor grader, or any other suitable machine. Machine 10 may include a frame 7, a power source 12, a hydraulic pump 38, a drive train 11, and a control module 42. Machine 10 may further include one or more implement systems 22.

Power source 12 may include an engine such as, for example, a diesel engine, a gasoline engine, a gaseous fuel powered engine such as a natural gas engine, or any other engine apparent to one skilled in the art. Power source 12 also may embody another source of power such as a fuel cell, a power storage device, or any other source of power known in the art.

Power source 12 may include sensors configured to sense operational parameters associated with power source 12. Such sensors may include, for example, a power source speed sensor, a fuel flow sensor, and/or any other sensor associated with power source 12. Such sensors may include electrical and/or mechanical sensors or any combination thereof. For example, a magnetic pickup may be mounted near a flywheel associated with power source 12 such that metal associated with the flywheel (e.g., teeth) may trigger a response in the pickup for each rotation of the flywheel.

Power source 12 may be configured to include a reference torque, which may be obtained at a reference torque speed. Reference torque will mean a maximum available torque associated with power source 12 at a point where power source 12 is operating at an optimal operating condition (e.g., power source speed). For example, a power source 12 may be rated for a maximum 1000 Nm of torque at 1400 RPM. Therefore, a reference torque for such a power source 12 may be 1000 Nm and the reference torque speed may be 1400 RPM.

It is important to note for purposes of this discussion that power output associated with power source 12 may be expressed as a function of torque output. One of ordinary skill in the art will recognize that power output may be related to torque output as described by equation 1. Similarly, a rotational speed of power source 12 may remain substantially constant while the ratio between power output and torque output of power source 12 remains constant, as shown in equation 2.

$$P_{out} = T_{out} * 2\pi * RPMs/60 \quad (1)$$

$$P_{out}/T_{out} = 2\pi * RPMs/60 \quad (2)$$

Power source 12 may also include various systems configured to modify the operation of power source 12 (e.g., reduce power output). For example, where power source 12 is configured as an internal combustion engine, power source 12 may include a device (e.g., a governor) configured to modify fuel flow to power source 12, among other things.

Power source 12 may be operatively connected to a drive train 11 configured to transmit power generated by power source 12. Drive train 11 may include a power conversion unit 30, final output shaft 26, one or more drive shafts 15 operatively connected to a front axle assembly 21 and/or a rear axle assembly 23, and one or more driven traction devices 17, among other things. Power conversion unit 30 may be any type of device configured for converting at least a portion of the power output supplied by power source 12 into a form useable at traction devices 17. For instance, power conversion unit 30 may be a mechanical transmission including a fluidly-connected torque converter and planetary gears configured to modify gear ratios associated with power conversion unit 30. In another embodiment, power conversion unit 30 may include a constantly or infinitely variable transmission including, for example, a dual shaft configuration and an infinitely variable gear set configured to provide varying gear and speed ratios. In yet another embodiment, power conversion unit 30 may include an electric generator that converts at least a portion of the power output of power source 12 into electrical energy. In yet another embodiment, power conversion unit 30 may include a hydro-static system including a hydraulic pump configured to convert at least a portion of the power output of power source 12 into a flow of pressurized fluid for driving one or more hydraulic motors associated with traction devices 17. And, in yet another embodiment, power conversion unit 30 may include a split torque transmission. One of ordinary skill in the art will understand that the methods of the present disclosure may be utilized in conjunction with numerous other power conversion units and the examples are meant to be exemplary only.

Power conversion unit 30 may include one or more shafts configured to accomplish a transfer of power from power source 12 to a final output shaft 26 of power conversion unit 30. For example, an input shaft configured to accept power input from power source 12, and an output shaft configured to output power to one or more drive train components in a suitable form (e.g., rotational energy) may be associated with power source 12. More or fewer shafts may be included with power conversion unit 30. For example, where power conversion unit 30 includes a torque converter (not shown), power conversion unit 30 may include an input shaft from power source 12 to the torque converter (not shown). Power conversion unit 30 may further include an output shaft from the torque converter (not shown) operatively connected to an input shaft associated with a gear set (not shown) associated with power conversion unit 30. The output shaft of the torque converter (not shown) may, therefore, function as the input shaft (i.e., one single shaft) to gear set (not shown). The gear set (not shown) may also include a final output shaft 26 operatively linking the gear set (not shown) of power conversion unit 30 with one or more components of drive train 11 (e.g., drive shafts 15).

Power conversion unit 30 may include one or more sensors configured to sense operational parameters associated with power conversion unit 30. For example, power conversion unit 30 may include an input shaft speed sensor and/or an output shaft speed sensor, among other things. Such sensors may include electrical and/or mechanical sensors or any combination thereof. For example, a magnetic pickup may be mounted near an input shaft associated with power conversion unit 30 and/or an output shaft associated with power conversion unit 30. Each magnetic pickup may be configured to detect gear teeth associated with the respective shaft (i.e., input or output) such that rotation of either shaft may trigger a response in the respective pickup during rotation of the shaft. In addition, power conversion unit 30 may include one or more sensors configured to provide information related to a gear selection associated with power conversion unit 30. Such a sensor may include a position sensor and/or any other sensors suitable for sensing data related to a gear selection.

Rotational speeds associated with input and output shafts associated with power conversion unit 30 may differ based on varying factors. Such factors may include, for example, a gear ratio associated with power conversion unit 30, a speed associated with power source 12, and/or friction associated with one or more traction devices 17, among other things. In one embodiment where power conversion unit 30 includes a torque converter (TC), a torque converter speed ratio may be calculated based on TC input and output shaft speeds according to equation 3 below. To calculate such a speed ratio, an output shaft speed associated with the TC may be divided by an input shaft speed associated with the TC to arrive at a speed ratio ($S_c$) as shown in equation 4 below. One of skill in the art will recognize that other speed ratios ($S_c$) may be calculated utilizing similar equations.

$$S_c = \text{Speed Ratio} = \text{Output Speed}/\text{Input Speed} = W_{out}/W_{in} \quad (3)$$

$$S_c = TC \text{ Output Speed}/TC \text{ Input Speed} = W_{out}/W_{in} \quad (4)$$

Further, based on these equations, it may be possible to determine an output torque of the TC utilizing equation 5, where the related function $f$ may be determined empirically and/or mathematically for any particular torque converter design.

$$T = f(W_{in}^2) \quad (5)$$

One of skill in the art will recognize that torque provided to power conversion unit 30 may, in effect, be multiplied or divided by power conversion unit 30 based on a gear ratio, an input speed, and an output speed associated with power conversion unit 30. By utilizing a TC speed ratio and a speed associated with power source 12, it may be possible to determine an approximate torque output of power conversion unit 30 and therefore, whether such torque may damage components associated with drive train 11. Based on such information, the power output of power source 12 may be limited to limit damage to components associated with drive train 11.

Drive shafts 15 may be operatively connected to final output shaft 26 of power conversion unit 30, by for example, a transfer unit 27 (e.g., a transfer case, transfer gearbox, or hydraulic linkage). Drive shafts 15 may include any driven members known in the art and configured to transmit power from power conversion unit 30 to front axle assembly 21 and/or rear axle assembly 23.

Front axle assembly 21 and rear axle assembly 23 may be operatively connected to at least one driven traction device 17 and may further provide support for machine 10 via driven traction devices 17. Axle assemblies 21 and 23 may, therefore, be configured to receive torque from power conversion unit 30 via drive shafts 15. Axle assemblies 21 and 23 may include any driven member known in the art for transmitting power from drive shafts 15 to driven traction devices 17. For example, axle assemblies 21 and 23 may include a housing, differential gears, bevel gears, pinion gears, final drive assembly, bearings, washers, and shafts, among other things, configured to transmit rotational energy to driven traction devices 17.

Front axle assembly 21 and rear axle assembly 23 may include particular limitations with respect to the amount of torque they may receive prior to being damaged. Such limits may be based on axle assembly design, component material, axle assembly temperature, and a derate modifier value related to, for example, time in service, machine age, and cumulative energy output, among other things. Therefore, predetermined values for a maximum torque may be determined empirically and/or mathematically for any particular axle assembly configuration. Such data may then be utilized in determining data related to power source derate values based on operational parameters associated with power conversion unit 30 and power source 12.

Hydraulic pump 38 may be configured to produce a flow of fluid at a particular discharge pressure, and therefore may consume a portion of the available power produced by power source 12. Hydraulic pump 38 may include a variable displacement pump, a variable flow pump, or any other device for pressurizing a flow of fluid known in the art. For example, hydraulic pump 38 may be a variable displacement pump including a pump-flow control component such as a swash plate configured to vary the stroke of one or more pistons associated with the pump. Power consumption associated with hydraulic pump 38 may be calculated based on a flow associated with hydraulic pump 38 and a corresponding load. For example, one or more fans associated with a cooling package (not shown) on machine 10 may be configured to provide a flow of air over a fluid cooling heat exchanger configured to cool a fluid associated with power source 12. These fans may be, for example, hydraulically powered by a flow of fluid from hydraulic pump 38, thereby placing a load on power source 12. The load associated with the fans may depend on, for example, a temperature associated with power source 12 and the amount of cooling desired, among other things.

Hydraulic pump 38 may be operatively connected to power source 12 by, for example, a countershaft, a belt, an electrical circuit, or in any other suitable manner. Additionally, pressurized fluid from hydraulic pump 38 may be supplied to numerous circuits included with machine 10 including, for example, an implement circuit associated with implement system 22.

Implement system 22 may include an implement 24 for performing various tasks including, for example, loading, compacting, lifting, brushing, and other desired tasks. Implement 24 may include numerous devices such as, for example, buckets, compactors, forked lifting devices, brushes, or other suitable devices as desired for accomplishing particular tasks. For example, machine 10 may be tasked to moving excavated earth from one point to another at a mine or similar site. Such an arrangement may be conducive to utilizing a bucket loader implement similar to that shown as implement 24. Further, implement system 22 may accomplish such tasks by imparting various motions to implement 24. Such motions may include, for example, rotating, extending, raising, lowering, tilting, and other suitable motions.

Implement system 22 may further include one or more implement system hydraulic cylinders 16 fluidly-connected to hydraulic pump 38, for imparting motion to various portions of implement system 22 (e.g., lifting, tilting, and/or rotating implement 24). Implement system hydraulic cylinders 16 may work in cooperation with various linkages associated with implement system 22 to affect a desired motion. Motion of implement system 22 may be imparted via extension and retraction of pistons associated with the one or more implement system hydraulic cylinders 16.

Figure 2:
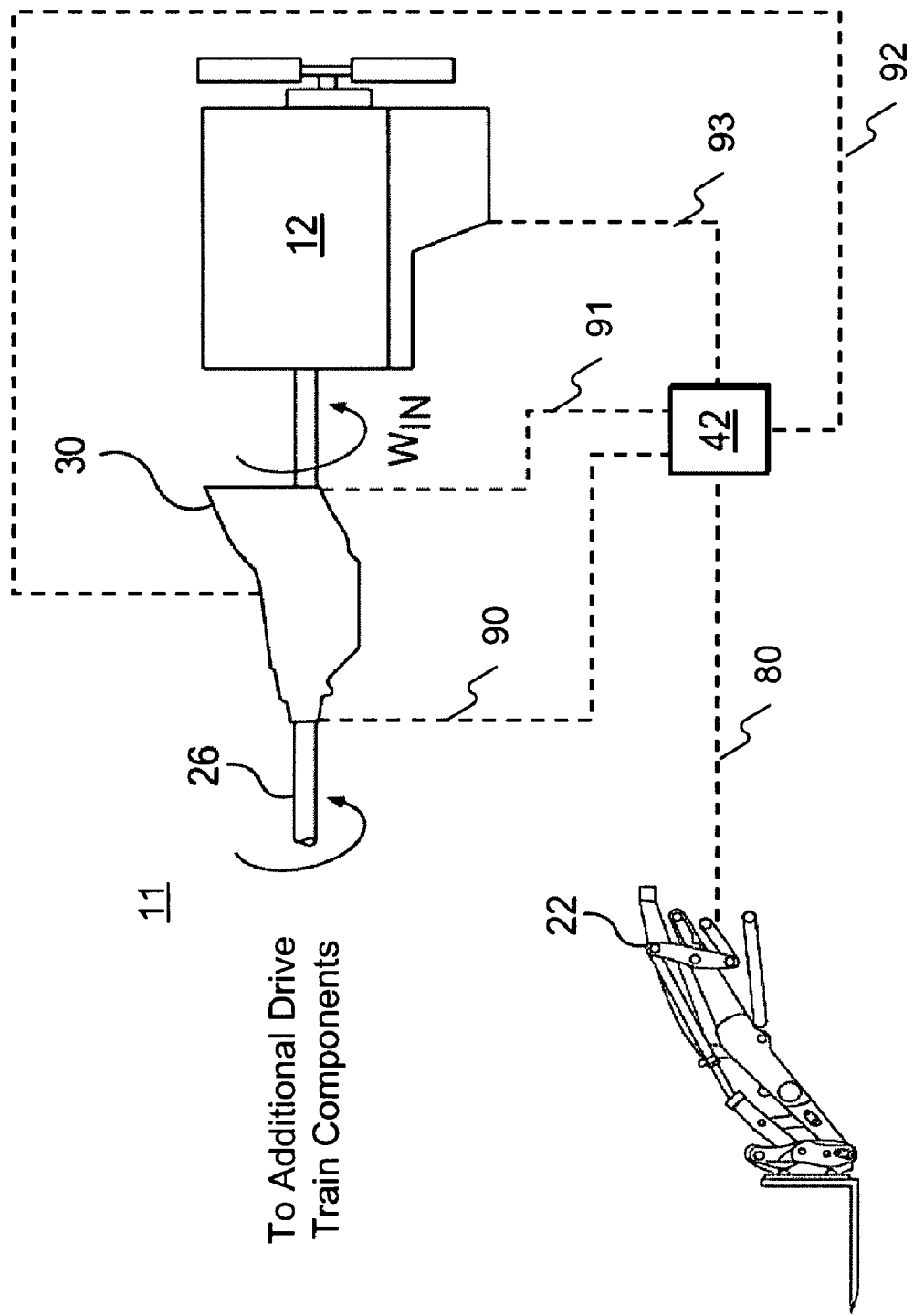
FIG. 2 is an exemplary illustration of a control communication schematic consistent with one embodiment of the present disclosure.

FIG. 2 is an exemplary illustration of a control communication schematic consistent with one embodiment of the present disclosure. Control module 42 may be a mechanical or an electrical based controller configured to receive and/or determine operating parameters associated with power source 12 and power conversion unit 30, among other things. For example, control module 42 may be communicatively connected to sensors associated with power conversion unit 30 (e.g., input and output shaft speed sensors, gear selection sensors, etc.) along, for example, lines 90 and 91, thereby allowing control module 42 to determine an input shaft speed, an output shaft speed, and a speed ratio, among other things, associated with power conversion unit 30.

Control module 42 may be configured to store data and algorithms related to speeds associated with power source 12, speeds associated with components of power conversion unit 30 (e.g., drive shafts 15), derate values (e.g., a percentage of reference torque associated with power source 12), and control signal data (e.g., fuel flow), among other things. Such data may be stored in a lookup table within control module 42 for reference, and/or portions of data may be calculated using algorithms stored within control module 42 and based on similar parameters. Such a configuration may enable a selection of a derate value or "reduction" value for power source 12 based on a speed associated with power source 12 and a speed ratio associated with power conversion unit 30. For example, memory associated with control module 42 may include a lookup table containing data indicating a derate value associated with power source 12 based on a torque converter speed ratio associated with power conversion unit 30 and a speed associated with power source 12. Derate values may be based on a reference torque value such as a maximum available torque associated with power source 12 at an optimal operating condition. For example, a power source 12 may be rated for a maximum 1000 Nm of torque at 1400 RPM. Therefore, a reference torque for such a power source 12 may be 1000 Nm. Derate values may then be expressed as, for example, a percentage of a reference torque associated with power source 12 (e.g., 70 percent of a reference torque associated with power source 12), a torque difference (Δ) from a reference torque (e.g., −300 Nm), and/or an actual final torque output value (e.g., 700 Nm), among others. Derate values may be empirically determined based on torque tolerances associated with one or more components related to drive train 11 (e.g., a front axle assembly), among other things. Alternatively, data may be mathematically calculated and stored in the memory based on a torque output associated with power conversion unit 30. Therefore, for any particular torque converter speed ratio associated with power conversion unit 30, and a speed associated with power source 12, a derate value (e.g., a percentage of maximum available torque associated with power source 12) may be determined based on data within the lookup table.

In another embodiment, a drive train component torque tolerance may change based on an derate modifier value related to machine 10 and/or components associated with drive train 11. For example, values may include derate modifier values such as, a time in service (e.g., machine time in service and/or drive train time in service), age, time since last rebuild, or any other suitable derate modifier value. Alternatively, other derate modifier values may be related to distance traveled by machine 10 (e.g., miles on machine) and/or cumulative energy output associated with machine 10 (e.g., Joules and/or kilowatt hours). In such a case, another lookup table may contain data indicative of a derate modifier value which may be added to, or subtracted from the derate value described above. The derate modifier value may therefore allow an original derate value to be modified based on the determined derate modifier value for further limiting the possibility that the drive train will be damaged, and/or to extend the expected life of drive train components. For example, where front axle assembly 21 has been in service for 7,000 hours, a derate modifier value may be specified as an additional 3 percent reduction from the reference torque. Therefore, assuming an original derate value is determined to be 70 percent of a reference torque, power source 12 may be caused to operate at 67 percent of an associated reference torque to account for the additional 3 percent reduction based on time in service.

In yet another embodiment, data stored in a lookup table associated with control module 42 may include power consumption values associated with ancillary systems of machine 10. For example, one or more cooling fans may apply a variable load to power source 12 based on numerous factors such as, power source 12 temperature and heat exchanger cooling capacity, among other things. A portion of a power output from power source 12 may be supplied to such ancillary systems for purposes of providing driving power to the systems, and therefore, may not be provided to components of drive train 11. Therefore, data related to power consumption values may be utilized by control module 42 to increase power output of power source 12 to compensate for the power consumption of the one or more ancillary components. This may, in effect, cause a corresponding increase in power output from power source 12, which is subsequently absorbed by the one or more ancillary components. For example, where a derate value indicates a 70 percent reduction in torque from power source 12, but ancillary systems are consuming 3 percent of the available torque, power source 12 may be caused to operate at 73 percent of an associated reference torque to account for the additional 3 percent of torque absorbed by ancillary systems. Alternatively, no such compensation may be made.

Control module 42 may also contain algorithms for determining an appropriate response to cause a modification to a power output associated with power source 12. For example, where a derate value has been determined based on the lookup table discussed above, control module 42 may calculate or otherwise determine an appropriate response to limit the power output of power source 12 such that the torque output of power source 12 does not exceed the reduced torque value and the speed associated with power source 12 remains substantially unchanged. Such a response may include transmitting a signal via line 93 to a fuel control unit (e.g., governor) associated with power source 12 to modify a fuel flow. By manipulating a fuel flow to power source 12, power source 12 may be derated to operate on a power curve consistent with the reduced torque value. One of ordinary skill in the art will recognize that other appropriate responses may be utilized and are intended to fall within the scope of the present disclosure.

INDUSTRIAL APPLICABILITY

The disclosed methods may be applicable to any powered system that includes a power source and a power conversion unit configured to impart motion to a machine. The disclosed methods may allow for controlling a power output associated with power source 12 such that an infinite number of power curves may be associated with power source 12. In particular, the disclosed systems and methods may assist in reducing machine stresses and damage, particularly those related to one or more drive train components (e.g., an axle assembly), while better balancing component life and machine performance considerations. Operation of the disclosed systems and methods will now be explained.

A power source may be configured to provide varying amounts of torque based on fuel supplied to the power source, among other things. For example, a power source may have a reference torque of 1000 Nm at a power source speed of 1400 RPM. This torque may be applied to various systems associated with the machine, such as, for example, drive train 11, implement system 22, and one or more cooling fans. Drive train components associated with machine 10 may be limited in the amount of torque that can be applied before potentially being damaged. For example, axle assemblies 21 and 23 may be rated for a maximum 200 Nm of torque before potential damage occurs. Such damage may include gear bending, gear pitting, roller bearing damage, ball bearing damage, shaft shearing, etc. Therefore, it may be beneficial to limit the amount of torque flowing to the axle assembly from power source 12 based on a derate value designed to limit the potential for damage (e.g., 200 Nm).

Further, ancillary systems associated with a machine may consume power (i.e., absorb torque) provided by power source 12 to hydraulic pump 38 in the form of a flow of pressurized fluid, among other things. The pressure associated with the fluid and the volume of flow may cause a load to be placed on power source 12, consuming power that may not then be provided to components of drive train 11. Therefore, in some embodiments it may be desirable to compensate for this power consumption when determining a derate value.

Figure 3:
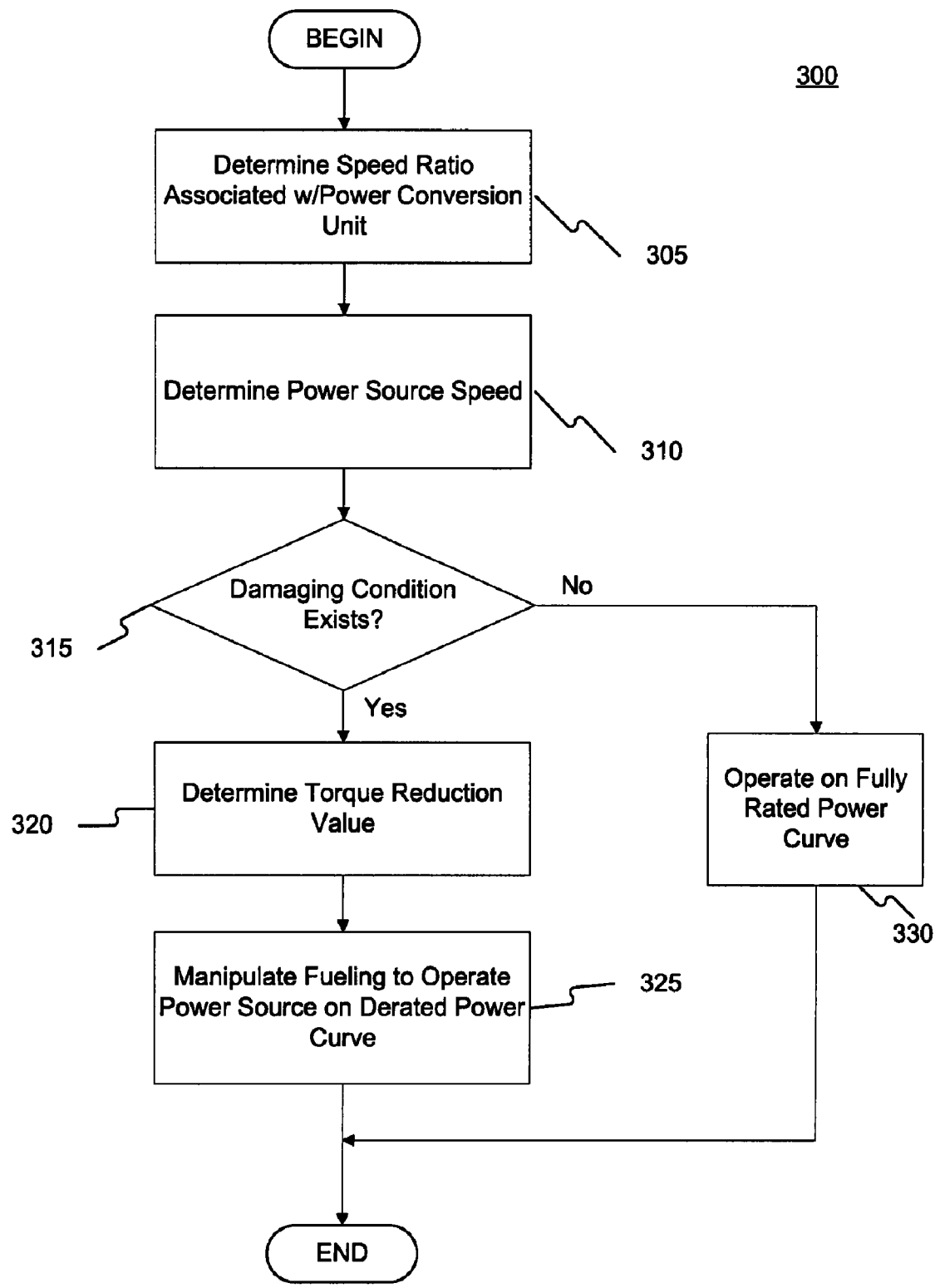
FIG. 3 is an exemplary flowchart illustrating a method for limiting a torque associated with a drive train.

FIG. 3 is an exemplary flowchart 300 illustrating a method for variable power curve torque control. While the following example is discussed in the context of a power conversion unit 30 including a torque converter, one of skill in the art will recognize that similar methods may be applied to any other power conversion unit 30 known in the art. Control module 42 may determine a speed ratio associated with power conversion unit 30 (step 305). As described above, control module 42 may determine a speed ratio based on equations (3) and (4) or other suitable method. For example, control module 42 may utilize the speed associated with power source 12 determined below at step 310 (e.g., 2100 RPM) in conjunction with an output speed associated with power conversion unit 30 (e.g., 840 RPM). Plugging such exemplary values into equation 4 may result in an exemplary speed ratio associated with power conversion unit of 0.4.

Control module 42 may also receive data from a sensor associated with power source 12 for purposes of determining a speed associated with power source 12 (step 310). For example, sensors associated with power source 12 may indicate a speed associated with power source 12 of approximately 2100 RPM and transmit such data to control module 42.

Control module 42 may utilize such data and a look-up table or other suitable data structure to determine whether a damaging condition exists by locating a data point where an exemplary speed ratio ($S_c$) is approximately equal to 0.40 and a speed associated with power source 12 is approximately equal to 2100 RPM (step 315). As noted, in one embodiment, a drive train damaging condition may be identified when a torque converter speed ratio falls below a threshold value, and a speed associated with power source 12 substantially equals or exceeds a reference torque speed associated with power source 12. Based on the determined information, control module 42 may determine that a damaging condition exists (step 315: yes) and may determine a desired torque reduction or derate value (step 320). In one embodiment, such a derate value may be 67.4 percent of a reference torque associated with power source 12. In one embodiment, following determination of the derate value, control module 42 may determine a derate modifier value related to machine 10 and/or components of drive train 11. Based on such a derate modifier value, control module 42 may modify the derate value as indicated by data stored in control module 42. For example, components of drive train 11 may have been in service for 7,000 hours since last maintenance with a next maintenance interval specified at 10,000 hours. Based on this information control module 42 may determine a desired derate modifier value to be, for example, 2 percent. Control module 42 may, therefore, further derate power source 12 by 2 percent, yielding a derate value of 65.4 percent of a reference torque associated with power source 12 (e.g., 1000 Nm at 1400 RPM). One of ordinary skill in the art will recognize that any time or other value may be used as desired for determining a control module 42 may derate power source 12 by a smaller or greater amount depending on desired lifetime characteristics associated with components of drive train 11 and hours in service, among other things.

Control module 42 may also determine a power consumption value associated with one or more ancillary systems on machine 10. For example, one or more fans may cause hydraulic pump 38 to exert a load on power source 12, thereby consuming a portion of power provided by power source 12. Because such power may not be transferred to components associated with drive train 11, control module 42 may compensate for such power by reducing the derate value. In such an example, control module 42 may determine that to compensate for power absorbed by one or more ancillary systems, an appropriate derate value should be decreased (i.e., percentage value increased) by 1 percent. Continuing the example from above, such a decrease (i.e., a percentage increase) may result in a final derate value of 66.4 percent of a reference torque associated with power source 12.

Following a determination of a final derate value, control module 42 may manipulate fueling associated with power source 12 such that power source 12 is caused to operate on the desired derated power curve (step 325). For example, where a final derate value of 66.4 percent has been determined and a reference torque associated with power source 12 is 1000 Nm at 1400 RPM, a torque limit may be calculated by multiplying the derate value by the reference torque to yield a torque limit value of 664 Nm. Control module 42 may therefore manipulate fuel flow to power source 12 based on stored data such that torque output from power source does not exceed 664 Nm with a corresponding decrease in power output such that power source speed remains substantially unchanged. Control module 42 may, for example, transmit control signals to a governor associated with a fuel system of power source 12, or controller 42 may utilize any other suitable method for manipulating fuel flow to limit torque.

In another example, control module 42 may determine that no torque reduction is desired when under particular operating conditions (step 315: no). In such an example, control module 42 may determine that a derate value is equal to 100 percent of a reference torque associated with power source 12 (i.e., fully rated power) (step 330). Therefore, no manipulation of fueling to power source 12 may be undertaken, and power source 12 may operate on a fully-rated power curve until a damaging condition is detected.

Because the method and system of the present disclosure derate a power source only upon detection of a damaging condition, and because conditions posing the potential for damage are predetermined, machine performance may be beneficially balanced with drive train component life considerations. Further, because a minimum number of sensors are utilized for detecting operational conditions, significant cost savings may be realized.

It will be apparent to those skilled in the art that various modifications and variations can be made in the disclosed methods and systems without departing from the scope of the disclosure. Additionally, other embodiments of methods for limiting drive train torque will be apparent to those skilled in the art from consideration of the specification. It is intended that the specification and examples be considered as exemplary only, with a true scope of the disclosure being indicated by the following claims and their equivalents.

We claim:

1. A method for derating a power source to limit damage to a drive train of a machine, the method comprising:
   determining a first operational parameter associated with a power conversion unit, wherein the first operational parameter is a torque converter speed ratio;

selecting a power source derate value based on the torque converter speed ratio; and
reducing an available power output associated with the power source according to the power source derate value.

2. The method of claim 1, further including:
determining a derate modifier value associated with the machine; and
modifying the power source derate value such that the power output associated with the power source is further reduced or increased based on the derate modifier value.

3. The method of claim 1, wherein selecting a power source derate value is further based on a second operational parameter associated with the power source, wherein the second operational parameter is a speed associated with the power source.

4. The method of claim 3, wherein the selected power source derate value is less than 100 percent when a torque converter speed ratio falls below approximately 0.9, and a speed associated with the power source exceeds a reference torque speed associated with the power source.

5. The method of claim 1, wherein the reducing step includes manipulating a fuel flow to the power source.

6. The method of claim 5, wherein the speed associated with the power source remains substantially unchanged during the reducing step.

7. The method of claim 1, wherein the available power output associated with the power source is reduced based on a desired torque reduction.

8. The method of claim 7, wherein the power source derate value is specified as a percentage of a reference torque associated with the power source.

9. The method of claim 8, further including:
determining a derate modifier value associated with the machine; and
modifying the power source derate value such that the power output associated with the power source is further reduced or increased based on the derate modifier value.

10. The method of claim 9, wherein the derate modifier value is based on at least one of a machine age, a machine time in service, a machine time to next rebuild, a machine distance traveled, and a machine cumulative energy output.

11. The method of claim 8, further including:
determining a power consumption value associated with at least one ancillary system associated with the machine; and
reducing the power source derate value such that the reduced power output associated with the power source is augmented to include an amount of power approximately equal to the power consumption value.

12. A method for controlling a drive train torque on a machine, the method comprising:
determining, based on an output speed associated with a torque converter and a speed associated with a power source, a torque converter speed ratio;
determining, based on the torque converter speed ratio and the speed associated with the engine, a power source derate value;
providing a control signal, according to the power source derate value, to derate the power source to operate on a reduced-power power curve;
determining a derate modifier value associated with a history of the machine; and
adjusting the derate of the power source based on the derate modifier value.

13. The method of claim 12, wherein the power source derate value is stored in a table of power source derate values within a control module, indexed by torque converter speed ratio and engine speed.

14. The method of claim 12, wherein the power source derate value is indicative of a percentage of a reference torque associated with the power source.

15. The method of claim 14, wherein the control signal causes a fuel control module to limit fuel to the power source such that a torque output associated with the power source is limited to the percentage of the reference torque associated with the power source.

16. The method of claim 15, wherein the speed associated with the power source remains substantially unchanged when derating the power source.

17. The method of claim 12, further including:
determining a power consumption value associated with at least one ancillary system associated with the machine; and
reducing the power source derate value by an amount approximately equal to the power consumption value.

18. A machine, comprising:
a frame;
a traction device associated with one or more drive train components;
a power source mounted to the frame and operatively connected to a power conversion unit, the power conversion unit operatively connected to the one or more traction devices; and
a control module configured to:
determine a first operational parameter associated with a power conversion unit, wherein the first operational parameter is a torque converter speed ratio;
select a power source derate value based on the torque converter speed ratio; and
reduce an available power output associated with the power source according to the derate value,
wherein a speed associated with the power source remains substantially unchanged during the reducing step.

19. The machine of claim 18, further including:
at least one ancillary system associated with the machine, wherein the control module is further configured to:
determine a power consumption value associated with the at least one ancillary system; and
reduce the power source derate value such that the reduced power output associated with the power source is augmented to include an amount of power approximately equal to the power consumption value.

20. The machine of claim 18, wherein the control module is configured to:
determine a derate modifier value associated with the machine; and
modify the power source derate value such that the power output associated with the power source is further reduced or increased based on the derate modifier value.

* * * * *